United States Patent [19]

Bellows et al.

[11] 4,346,150
[45] Aug. 24, 1982

[54] ELECTROCHEMICAL CONSTRUCTION

[75] Inventors: Richard J. Bellows; Patrick G. Grimes, both of Westfield; Kenneth R. Newby, Berkeley Heights; Harry Einstein, Springfield; Hsue C. Tsien, Chatham Township, Morris County, all of N.J.

[73] Assignee: Exxon Research & Engineering Co., Florham Park, N.J.

[21] Appl. No.: 268,675

[22] Filed: Jun. 1, 1981

[51] Int. Cl.³ .................. H01M 4/00; H01M 8/00
[52] U.S. Cl. ..................................... 429/18; 429/34; 429/72; 429/101; 429/149; 204/269
[58] Field of Search ............... 429/18, 34, 38, 39, 429/72, 101, 105, 17, 19, 149, 152; 204/253, 254, 255, 257, 269, 279, 280

[56] References Cited

U.S. PATENT DOCUMENTS

| | | | |
|---|---|---|---|
| 3,476,609 | 11/1969 | Gelting et al. | 429/39 X |
| 3,516,866 | 6/1970 | Warszawski | 429/39 |
| 3,533,847 | 10/1970 | Maurer | 429/34 |
| 3,565,693 | 2/1971 | Tapsell | 429/34 |
| 3,589,941 | 6/1971 | Eaton et al. | 429/38 |
| 3,979,224 | 9/1976 | Strasser | 429/18 |
| 4,105,829 | 8/1978 | Venero | 429/15 |
| 4,203,821 | 5/1980 | Cramer et al. | 204/294 X |
| 4,210,512 | 7/1980 | Lawrance et al. | 429/38 X |
| 4,214,969 | 7/1980 | Lawrance | 429/39 X |
| 4,252,628 | 2/1981 | Boulton et al. | 204/279 X |

OTHER PUBLICATIONS

Extended Abstracts, vol. 79-2, The Electrochemical Society, Fall Meeting, Oct. 14-19-1979.
"Development of a Bipolar Zn/Br₂ Battery", R. J. Bellows, H. Einstein, P. G. Grimes, E. Kantner, and K. Newby, Aug. 18-22, 1980.
Doe Battery & Electrochemical Contractors' Conference, vol. II, Dec. 10-12, 1979, Sponsored by U.S. Department of Energy.

Primary Examiner—Anthony Skapars
Attorney, Agent, or Firm—Robert S. Salzman

[57] ABSTRACT

An electrochemical cell construction features a novel co-extruded plastic electrode in an interleaved construction with a novel integral separator-spacer. Also featured is a leak and impact resistant construction for preventing the spill of corrosive materials in the event of rupture.

12 Claims, 19 Drawing Figures

ZINC-BROMINE CIRCULATING BATTERY

Electrochemical Reactions:
$Zn° \rightleftharpoons Zn^{++} + 2e^-$
$Br_2 + 2e^- \rightleftharpoons 2Br^-$
Self discharge: $Zn° + Br_2 \longrightarrow ZnBr_2$

ELECTROCHEMICAL CONSTRUCTION

RELATED PATENTS AND APPLICATIONS

This application is related to U.S. Pat. Nos.:
4,105,829, issued: Aug. 8, 1978;
4,169,816, issued: Oct. 2, 1979;
4,197,169, issued: Apr. 8, 1980; and
4,259,417, issued: Mar. 31, 1981;
and U.S. patent applications:
U.S. Ser. No. 178,993, filed: Aug. 18, 1980;
U.S. Ser. No. 204,852, filed: Nov. 7, 1980;
U.S. Ser. No. 144,679, filed: Apr. 28, 1980;
U.S. Ser. No. 165,412, filed: July 3, 1980;
U.S. Ser. No. 160,143, filed: June 16, 1980;
U.S. Ser. No. 122,193, filed: Feb. 19, 1980;
U.S. Ser. No. 122,706, filed: Feb. 19, 1980; and
U.S. Ser. No. 97,194, filed: Nov. 26, 1979.

Inasmuch as many of the teachings expressed in the above-identified patents and applications may be useful in understanding the present invention, it is desired to incorporate these teachings in this disclosure by way of reference.

FIELD OF THE INVENTION

This invention relates to electrochemical cells, and more particularly to an improved cell construction which can be useful in vehicular battery systems.

The Government of the United States of America has rights in this invention pursuant to contract agreement No. 49-2862 entered into with Sandia National Laboratories on behalf of the United States Department of Energy.

BACKGROUND OF THE INVENTION

In recent times, the use of light weight battery materials and cost efficient battery constructions have been of prime interest to the automotive and battery industries. In particular, cost-effective battery designs are of paramount importance for electric vehicular systems. For electric vehicles and other bulk energy storage applications, cost justification of a battery system is highly sensitive to the initial battery cost and to the life-cycle cost. The present invention seeks to provide a new electrochemical cell construction which reduces the initial costs and extends operating life for a battery system through the utilization of new manufacturing techiques, new weight-reducing materials and new integration of components.

A new cell design and construction has resulted from the achievement of the above objectives, which design and construction features amongst other novelties:

1. An integral separator and spacer to reduce space, parts and cost.
2. A reduction in gas entrapment with the use of the new separator-spacer design.
3. An integral conductive/non-conductive (dielectric) coextruded plastic electrode which is both light weight and inexpensive to manufacture.
4. Reduction and/or elimination of parasitic shunt currents.
5. Male/female stacking and integration of parts and conduits to provide ease and compactness of assembly.
6. A two-piece interleaved bipolar battery assembly which is more compact, light weight, leakproof, easy to assemble and low cost.
7. A safer battery design and construction which reduces the possibility of spilling corrosive materials should compartments housing these materials rupture.

The subject invention is useful in the manufacture, construction and assembly of many different kinds of electrochemical cells, and the invention should be interpreted as not being limited to a specific system.

It is of particular interest for use in a circulating zinc-bromine battery, constructed in accordance with the teachings advanced in the afore-mentioned U.S. patent to: Agustin F. Venero, entitled: Metal Halogen Batteries and Method of Operating Same, U.S. Pat. No. 4,105,829, issued: Aug. 8, 1978, and assigned to the present assignee.

The above-mentioned battery system is of particular interest because of its low cost and availability of reactants, its high cell voltage and its high degree of reversibility.

DISCUSSION OF THE PRIOR ART

To the best of our knowledge and belief, the various novelties presented and described herein, are completely new within the art of electrochemical system design and construction. The skilled practitioner will gain a particular appreciation of the unique ideas and concepts advanced herein.

SUMMARY OF THE INVENTION

This invention relates to an electrochemical construction comprising a stack of cells each comprised of an integral separator and spacer disposed between adjacent electrodes each comprised of a composite plastic sheet having a coextruded electrically conductive mid-portion and electrically non-conductive top and bottom side portions. The separator-spacer and the sheet electrodes are assembled by male and female connections, which are hollow and form fluid conduits for the cells. The electrochemical construction may be comprised of more than one stack of cells.

The integral separator-spacer comprises a microporous sheet, which provides ionic communication between adjacent compartments of each cell. A web surface on each side of the microporous sheet is covered with projections for maintaining a spaced compartmental distance between said separator-spacer and said adjacent electrodes. The projections on one web surface are directly opposite corresponding projections on the other web surface of the sheet in order to provide a greater structural integrity to the sheet in its capacity to maintain a spaced distance between electrodes. The projections can be pebble or rod-shaped or a combination of pebble and rod-shapes.

The separator-spacer has a non-porous border substantially surrounding the microporous sheet, which microporous sheet can be ion-selective.

The electrodes have narrow non-conductive top and bottom side portion strips with respect to their larger conductive mid-portions. The electrodes can be made monopolar or bipolar, but can be specifically bipolar in order to operate in a zinc-bromine system, for example. The non-conductive side strips can be made of polypropylene, polyethylene, or copolymers thereof, while the conductive mid-portion comprises a carbon-containing polyolefin. More specifically, the conductive mid-portion comprises by weight 100 parts polyolefin, 25 parts carbon, 5 parts each pitch fiber and glass fiber and 1 part fumed silica powder. The extruded material can be hot formed and can be dimpled.

The electrochemical construction can be provided with a protective current in order to reduce or eliminate parasitic shunt currents in common electrolyte systems of this type.

The zinc-bromine electrochemical system of the invention also features a leak and impact resistant construction comprising:

a first inner compartment for storing a bromine-rich phase;

a second compartment substantially surrounding said first inner compartment and containing a first electrolyte for circulation through said cell;

a third compartment substantially surrounding both said second and first compartments and containing a second electrolyte for circulation through said cell; and an outer casing substantially surrounding said first, second and third compartments.

The first electrolyte is generally the catholyte for the system, while the second electrolyte is generally the anolyte. The bromine-rich phase is a non-aqueous phase which separates from the aqueous catholyte and contains bromine complexing agents.

The compartment and casing materials are generally comprised of chemically inert, impact resistant plastics.

It is an object of the present invention to provide a cost efficient electrochemical construction;

It is another object of this invention to provide an electrochemical construction which is light weight and compact;

It is a further object of the invention to provide a new electrochemical system having a high voltage and cyclic-life.

These and other objects of this invention will be better understood and will become more apparent with reference to the following detailed description considered in conjunction with the accompanying drawings.

BRIEF DESCRIPTION OF THE DRAWINGS

FIGS. 5a, 5b and 5c are respective top, front and side views of the coextrusion die used to fabricate the sheet electrode shown in FIGS. 3, 4, and 4a;

FIGS. 7a through 7d are illustrative of various designs for the projections depicted on the web surfaces of the separator-spacer shown in FIGS. 6 and 6a; and FIGS. 7aa through 7dd are side views of the projections depicted in respective FIGS. 7a through 7d.

DETAILED DESCRIPTION OF THE INVENTION

Figure 1:
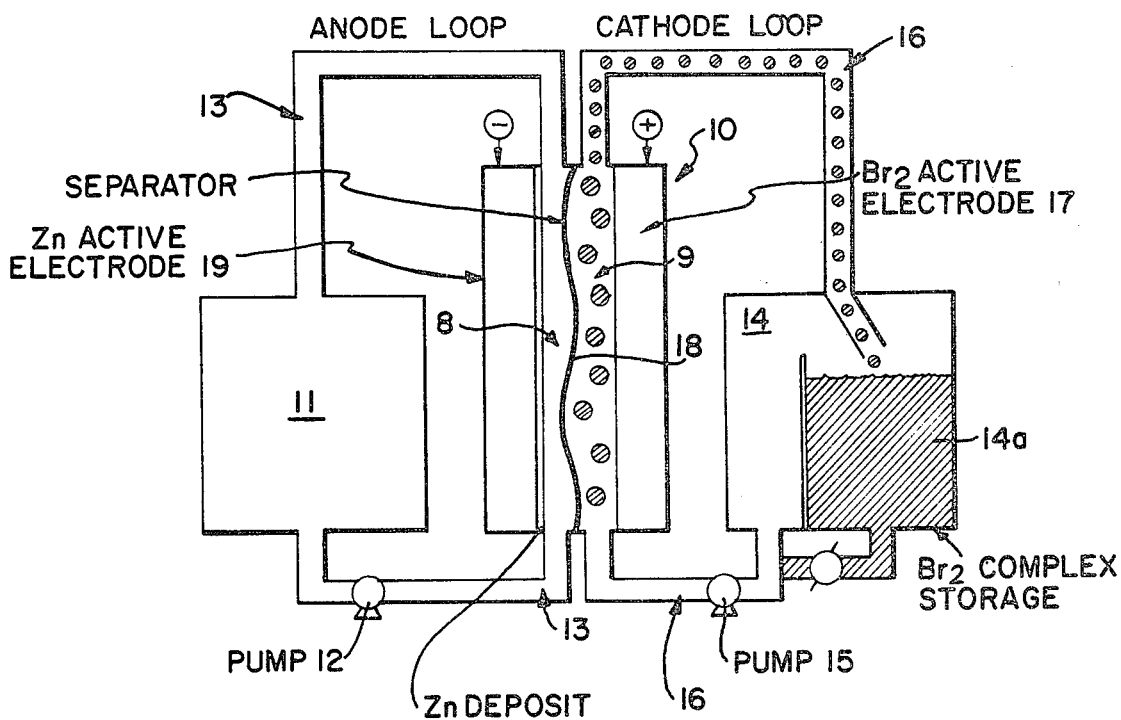
FIG. 1 is a schematic diagram of a typical circulating zinc-bromine system which can benefit from the inventive construction shown in the following FIGS. 2 through 7.

Referring to FIG. 1, a schemaic diagram of a typical circulating, bipolar zinc-bromine system is shown. This system can benefit from the inventive construction which will be hereinafter described with reference to FIGS. 2 through 7. The zinc-bromine system of FIG. 1 comprises two electrolytes which are circulated through separate compartments 8, 9 respectively, of the cell 10. An anolyte which is generally stored in reservoir 11 is pumped via pump 12 through compartment 8 and loop 13, generally referred to as the anode loop. A catholyte which is generally stored in reservoir 14, is pumped via pump 15 through compartment 9 and loop 16, generally referred to as the cathode loop.

The zinc-bromine system is also a two phase system, in that the catholyte has bromine complexing agents and is comprised of a first aqueous phase and a second, non-aqueous, bromine-rich phase. The bromine-rich (complexed) phase tends to separate at the bromine active electrode 17 from the aqueous catholyte. This non-aqueous phase is stored in the reservoir 14, as illustrated schematically by shaded portion 14a.

A separator 18 delinates and defines the boundary between the anolyte and cathode compartments 8 and 9, respectively. The separator 18 is a membrane which prevents or binders movement of anions such as the bromide and tribromide ions from cathode compartment 9 to the anode compartment 8. In a bipolar design, the zinc active electrode 19 and the bromine active electrode 17 are opposite sides of the same electrode structure.

Further description of the zinc-bromine system can be obtained with reference to afore-mentioned U.S. Pat. No. 4,105,829; issued Aug. 8, 1978.

The zinc-bromine system can be made more practicable by integrating and improving various components of FIG. 1, as will be hereinafter explained with respect to the inventive construction shown in FIGS. 2 through 7. Where applicable within the description, like components may have similar numerical designations for the sake of brevity.

Figure 2:
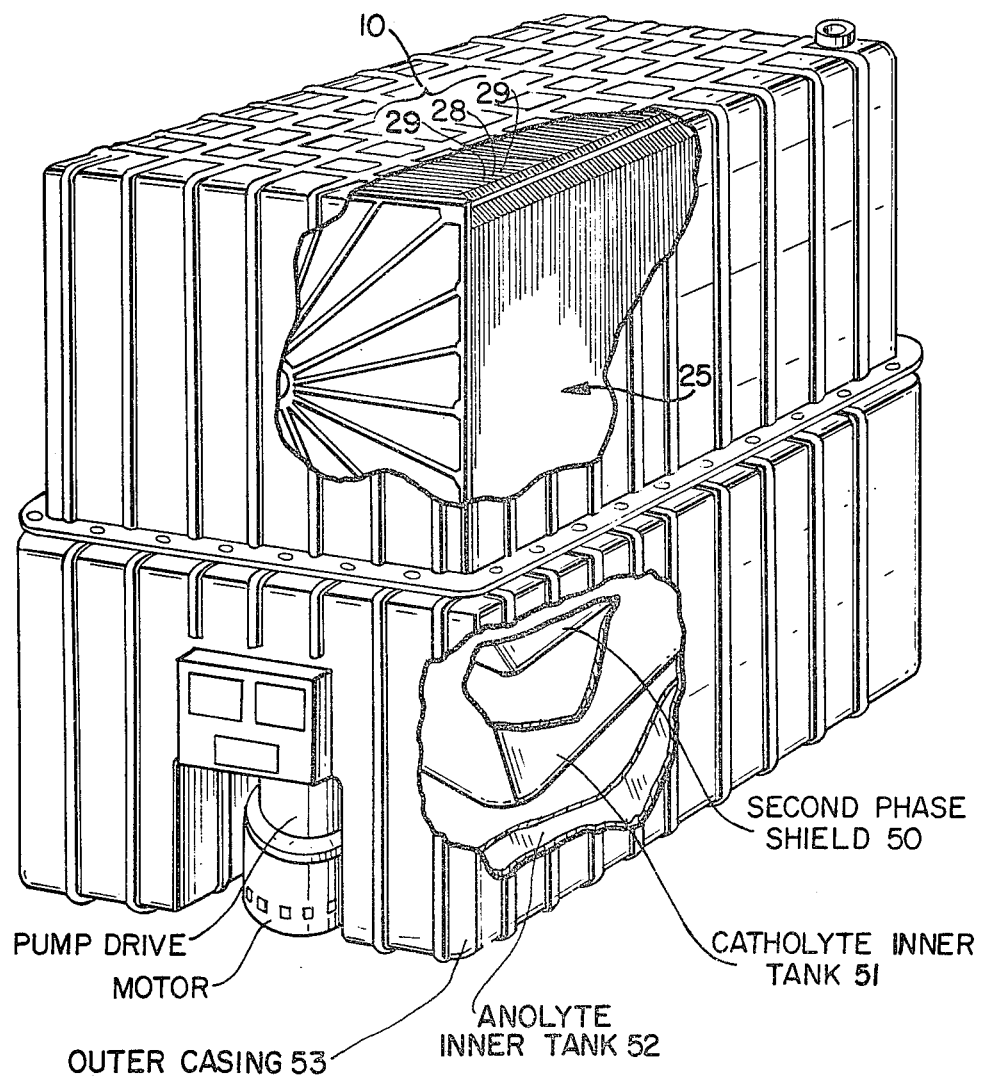
FIG. 2 is a partially cutaway prospective view of a zinc-bromine system constructed in accordance with this invention.

Now referring to FIG. 2, an improved electrochemical system is shown in a schematic perspective view. The improved system utilizes an integrated two-leaved separator-spacer and electrode forming a portion of a stack of cells, as depicted in the exploded view of FIG. 3.

Figure 3:
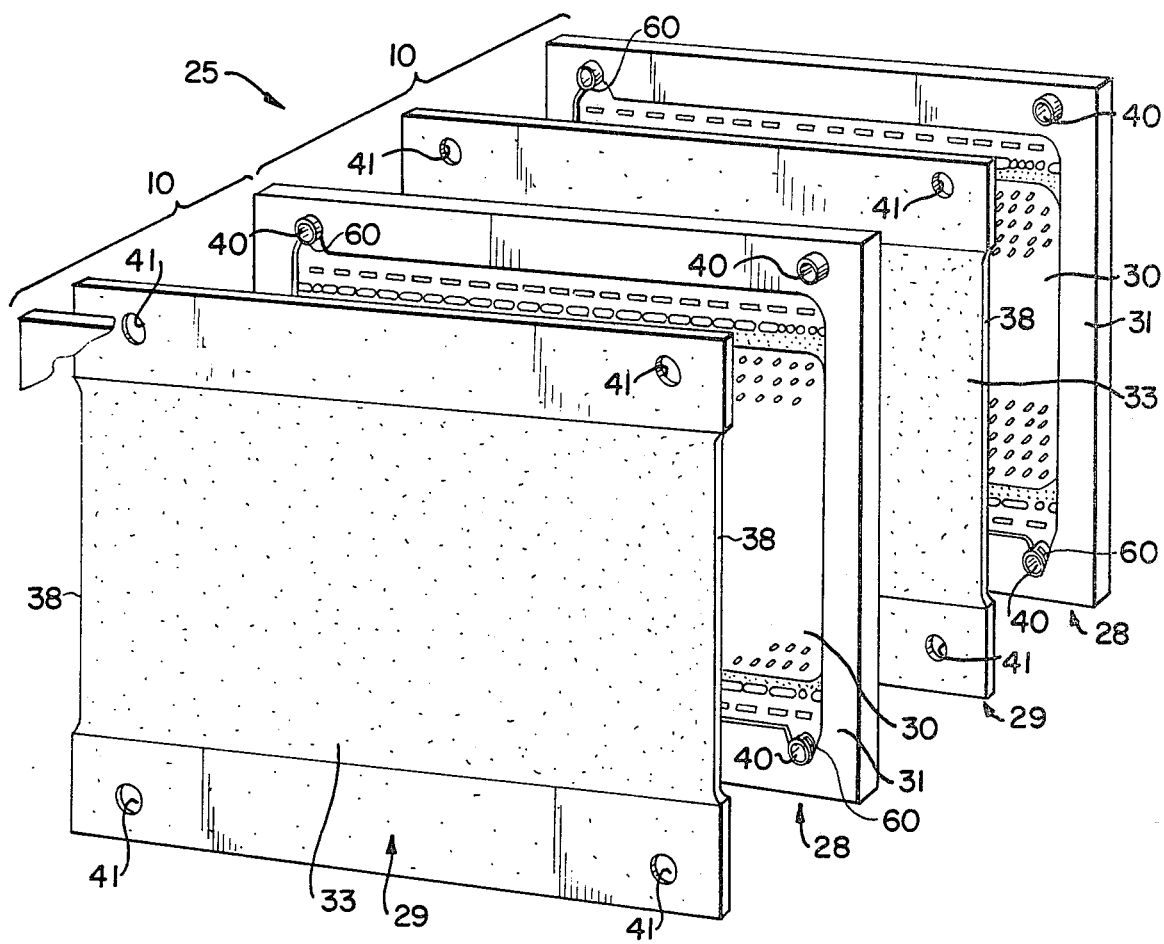
FIG. 3 is an exploded perspective view of the two-sheet stack construction of a portion of a stack of cells of the electrochemical system of this invention.

The electrochemical system of FIG. 2, comprises a battery stack 25 which in turn is comprised of a plurality of cells 10, each having two plates, as shown in FIG. 3. One plate, according to the invention, is an integral separator-spacer 28 and the other plate is an electrode sheet 29. The separator-spacer has two functions combined in a single sheet. The first purpose is that of the separator 18 in FIG. 1, i.e. to provide fluid communication between compartments as a membrane. A more detailed description of this function can be obtained from the above-mentioned U.S. Pat. No. 4,105,829; issued Aug. 8, 1978; and also from U.S. Pat. No. 4,259,417; issued Mar. 31, 1981 for an "Ionic Barrier", to inventors: R. J. Bellows and P. G. Grimes.

The second function of sheet 28 is to space the sheet 28 from the adjacent electrode sheets 29 so as to create respective anolyte and catholyte compartments 8 and 9 (FIG. 1). The separator-spacer sheet 28 has a microporous mid-portion surface 30 which is recessed from the non-porous surface 31 of the sides, as shown in more detail in FIGS. 6 and 6a. When the separator-spacer sheets 28 are pressed between electrode sheets 29, the stack structure 25 is formed, as shown in FIG. 2. The projections 32 on the microporous mid-portion surfaces are designed to maintain a spaced compartmental distance between the separator-spacer surface 30 and the flat conductive surfaces 33 of adjacent electrode sheet 29. The projections 32 provide structural means against collapse of surfaces 33 upon surfaces 30 and vice versa. The projections 32 on one side of sheet 28 are diametrically opposite corresponding projections 32 on the opposite side 30 of sheet 28 as clearly illustrated in FIG. 6a. This is done, to provide a greater strength against distortion of surfaces 33 upon surfaces 30. The projections 32 usually are designed as pebbles as depicted by arrows 32a in FIG. 6a, and as also shown in FIGS. 7cc and 7dd, etc.

Figure 7A:
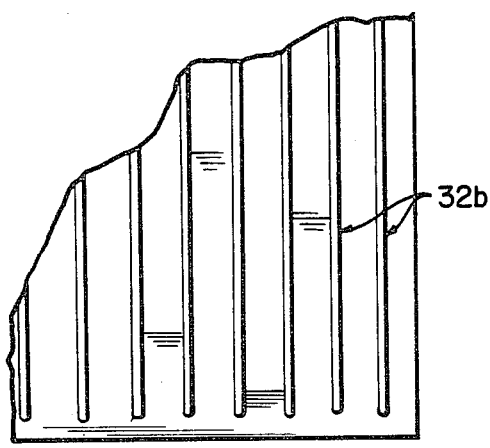
Figure 7B:
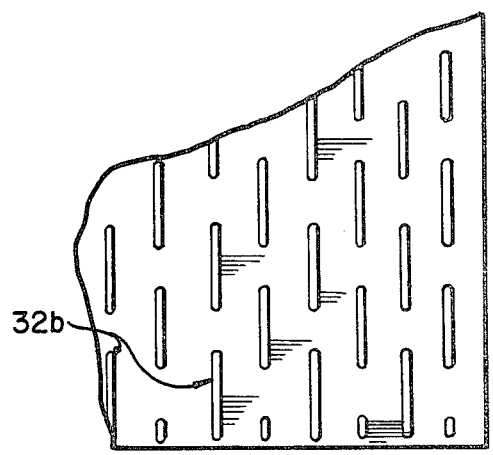
Figure 7A:
Figure 7B:

These projections 32 may also be designed with a rod-shape as depicted in FIGS. 7a, 7aa and 7b, 7bb; by arrows 32b. The projections 32 may also be a combination of pebble and rod-shaped protuberances as depicted in FIGS. 7c, 7cc and 7d, 7dd.

The design of these projections allow for an expeditious flow of electrolyte through the compartments 8 and 9, respectively. The flow of electrolyte is accomplished without entrapping gas bubbles about projections 32 within the compartmental cavities 8 and 9.

The mid-portion of the separator-spacer sheet 28 can be comprised of a microporous membrane material known as Daramic ®, Series HW-0835, which is made by W. R. Grace Co., Polyfibron Division, Cambridge, Mass. The raised side borders 31 of non-porous material may be any moldable plastic. The plastic of borders 31 is typically overmolded around the separator-spacer insert by injection molding, as can be seen from FIG. 6a.

Figure 6:
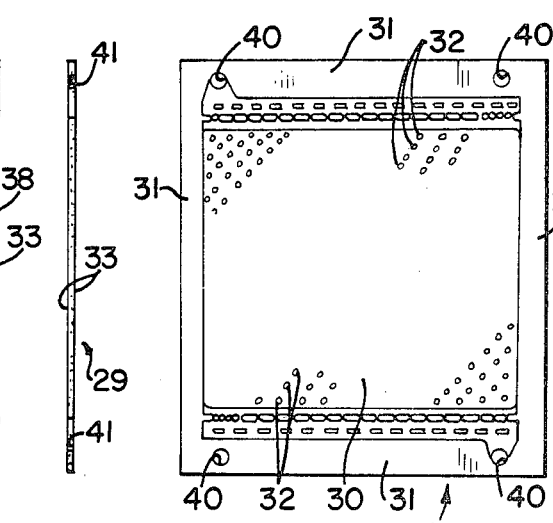
FIG. 6 is a front view of the integral separator-spacer illustrated in the inventive construction of FIG. 3.
Figure 6A:
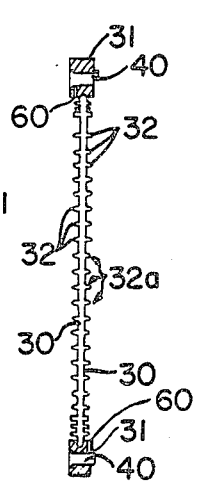
FIG. 6a is a side view of the integral separator-spacer depicted in FIG. 6.
Figure 7C:
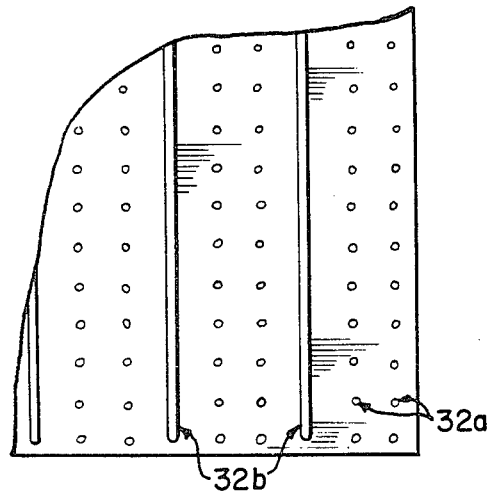
Figure 7D:
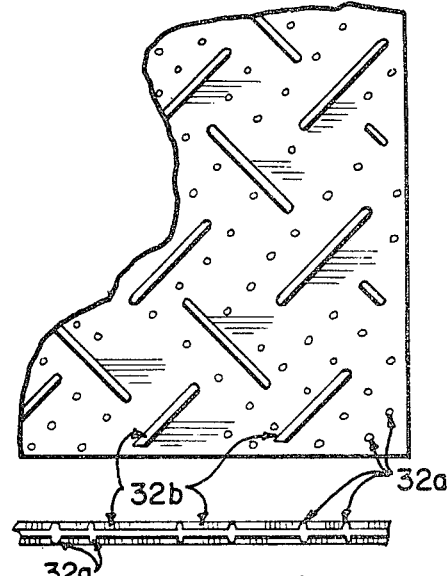
Figure 7C:

Sheets 28 and 29 are assembled by means of hollow male/female connectors 40 shown in detail in FIGS. 6 and 6a. When the sheets 28 and 29 are assembled in a stack 25, these hollow connectors 40 form electrolyte manifolds which supply compartments 8 and 9 with electrolyte via individual conduits or channels 60.

The male/female connectors 40 of sheets 28 fit through the holes 41 (FIGS. 4 and 4a) in adjacent sheets 29, and snap into mating connectors 40 in subsequently adjacent sheets 28.

Figures 4, 4A:
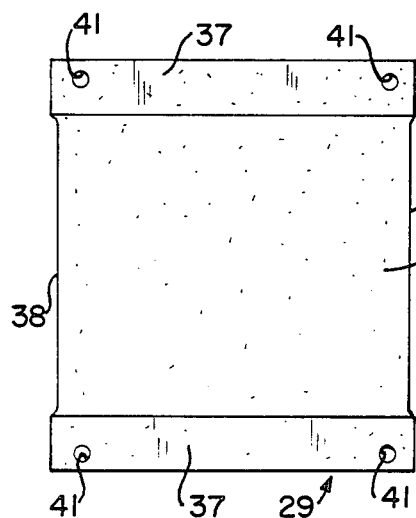
FIG. 4 is a front view of the coextruded sheet electrode of the inventive construction shown in FIG. 3.
FIG. 4a is a side view of the sheet electrode of FIG. 4.

The electrode sheet 29 of FIGS. 4 and 4a is comprised of a coextruded sheet of plastic which has an electrically conductive mid-portion 33 and two side portions 37 of electrically non-conductive (insulating) plastic. The top and bottom side portions 37 are coextruded "side-by-side" along with the mide-portion 33 to form a one piece continuous electrode sheet, which continuous sheet is then cut to specific lengths to form a plurality of smaller sheets 29. The edges 38 of sheet 29 may be undercut to improve electrical isolation in stack 25.

This "side-by-side" profile co-extrusion of insulating and conductive plastic sheets 37 and 33, respectively, presents a new and an alternative fast method of production for all monopolar and bipolar electrodes including electrodes for zinc bromine batteries. Compared with compression molding, the co-extrusion method gives more uniformity in thickness, a stronger bonding between the insulating and conductive plastics, much desired flatness, and "electrode by yards" similar to dress fabrice. The fabrication cost is much lower because the process is continuous.

A special formulation of carbon plastic is needed for mid-portion 33 of sheet 29 to provide good electrical conductivity, which still exhibit good extrudibility, good strength, and excellent anticorrosive properties against bromine and zinc bromide in the electrolyte.

The preferred composition of the conductive carbon plastic is covered by aforementioned U.S. Pat. No. 4,169,816; issued Oct. 2, 1979, to H. C. Tsien. This formulation gives good conductivity (1 to 2 ohm-cm in resistivity), good flex strength, low permeability inertness to bromine, good extrudibility, better weldability and less mold shrinkage.

The conductive plastic is a mixture of 100 parts by weight of polyolefin copolymer, 25 parts by weight of special conductive carbon, 5 parts by weight each of carbon fiber and glass fiber, and 1 part by weight of fumed silica powder.

Some of the other advantages of coextruding the section 33 and 37 are:

1. Good bonding between the insulating and conductive plastics.

2. Maintaining width, flatness and thickness dimensions with the tolerances specified.

3. Clear and sharp boundary lines between sections 33 and 37.

Figure 5A:
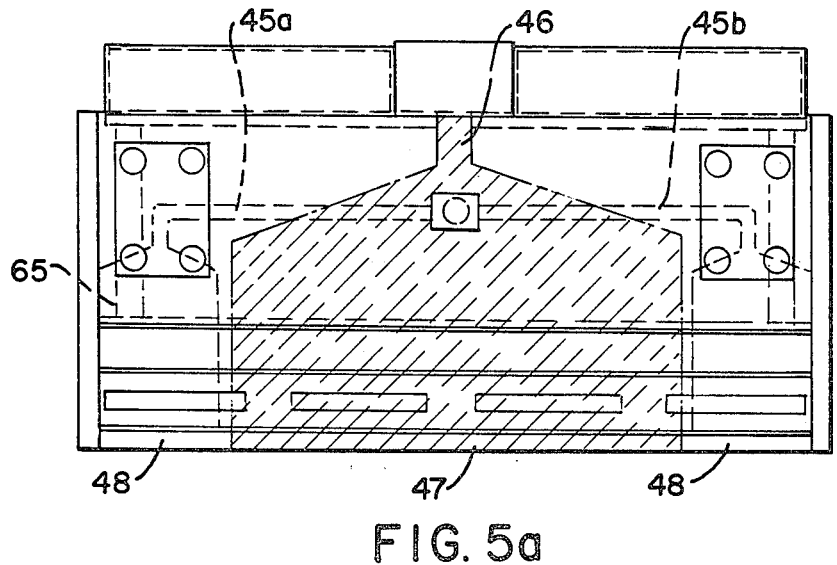
Figure 5B:
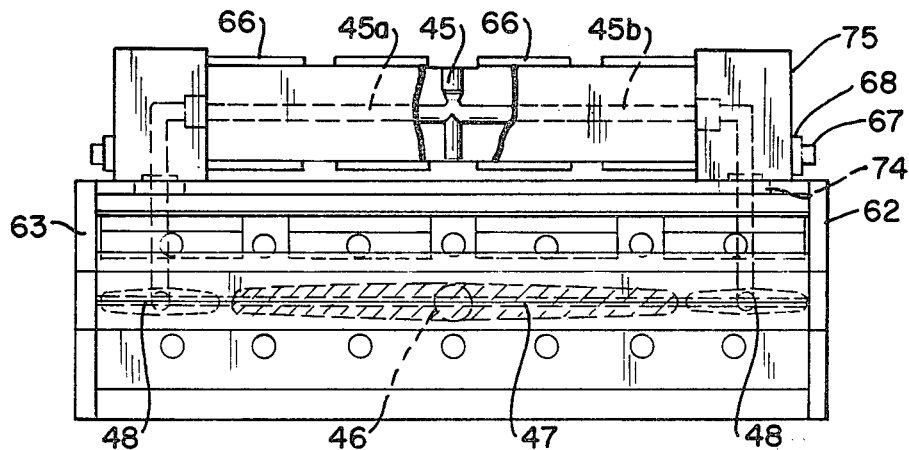
Figure 5C:
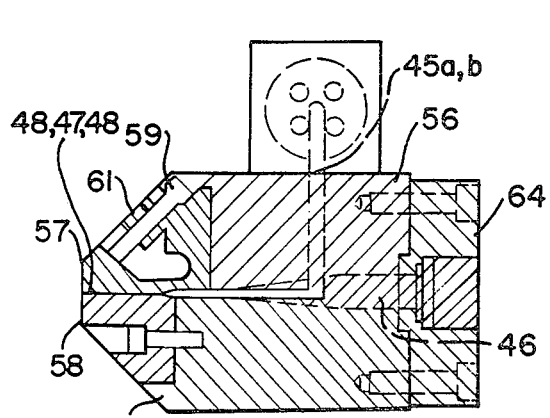

FIGS. 5a, 5b and 5c are respective top, front and side views of an extrusion die used to fabricate the electrode sheet. The center extrusion die 47 receives conductive plastic from a horizontal extruder through conduit 46, while the side extrusion dies 48, each receive non-conducting plastic from an overhead, vertical extruder via conduits 45a and 45b, respectively.

The horizontal extruder for the black conductive plastic is a $2\frac{1}{2}''$ screw with L/D of 30:1, while the vertical extruder for the opaque insulating plastic is a $1\frac{1}{2}''$ dia. screw with L/D of 24:1.

The melted insulating plastic enters into the die at 90 degrees from the vertical stream 45, divides into two steams 45a and 45b and flows into one left and one right separate "coat hangers" along side the main coat hanger 45. The die design is conventional, except that the side-by-side profile division is believed to be novel. The die is of split construction in order to facilitate any changes in the design and the ease of fabrication.

The main die assembly consists of a lower die body 55, upper die body 56, flexible upper lip 57 and fixed lower lip 58.

The die lip gap is ground to allow for the swell of plastics emerging out of the die. Lip gaps can be individually adjusted by screws 59 in conjunction with the nut bars 61. The two side plastics 62 and 63 close the two outsides of flow channels of the insulating plastics and give a box-like reinforcement.

Adapter 64 provides connection to the main extruder. There are (16) cartridge heaters 65 and (4) band heaters 66 for heating the two streams of plastics. Temperatures are controlled through thermocouples and individual zone temperature controllers.

The individual adjustment of the left and right streams 45a and 45b is made possible by ball headed adjusting screws 67 and locknut 68. Bushings 74 make good connection from valve blocks 75 to die block 56. All main parts of the die are made of A2 air hardening tool steel. The Bethlehem A2 air hardening steel has the following physical properties:

|  | As-annealed | Heat Treated |
| --- | --- | --- |
| Hardness (R/C) | 15–20 | 56–58 |
| Yield Strength psi | 55,000 | 208,750 |
| U.T.S. psi | 114,950 | 255,250 |
| Elongation % | 18% | .8% |

With the head pressures from the extruders well over 1000 psi, the die cannot operate free from internal leakage between the insulating and conducting streams if the die is in the soft annealed condition. The hardened and reground die eliminates internal leakage. Four different types of insulating plastics were tried, they are:

|  | Melt Flow Index |
| --- | --- |
| Fiberfil J60/20E | 230° C., 2160 gm load, 4.5 gm in 10 min. |
| UGI LR711 HDPE | 190° C., 2160 gm load, 10.5 gm in 10 min. |
| Exxon P.P. 5052 P.P. | 230° C., 2160 gm load, .9 to 1.5 gm in 10 min. |
| Exxon P.P. 5011 P.P. | 230° C., 2160 gm load, .45 to .85 gm in 10 min. |

Both Exxon homopolymer PP5011 and 5052 can match well with the conductive plastic. They came out of the die with no wrinkles, the sheets were flat and uniform.

Theoretically, aside from previous considerations, any polyethylene or polypropylene for side portions 37 can be a good match with the conductive plastic mid-portion 33, because the basic material used in the conductive plastic is the copolymer of the two. The melting points are in the range of 325 to 375° F. Therefore, approximately 400° F. is a proper temperature in range for the two streams to meet. Head pressures are 1500 to 1800 psi. These conditions made a good bond at the bonding line.

Close match of melt indices is necesary in order to eliminate scallops formed at the joint of the two edges. The viscosities and velocities of the streams from the two extruders has to be very closely equal. Pressures can be manipulated from two heads while varying the temperatures in various die zones to get the matching conditions. However, the differences between melt flow index of conductive and that of insulating plastics has to be minimized.

The extrusion speed can be around 20 ft./minute to 90 ft./minute.

There are many downstream attachments that can be added so that the co-extruded sheet can be worked on while still hot and soft. Thus, the repeated heating and cooling cycles with the accompanied plastic degradations can be eliminated. Powder of activated carbon can be sprayed on one face of the carbon plastic as the sheet is emerging from the die and before the sheet is pinched by the cold nip rolls. The powder spray is limited in the conductive area.

Various types of surface finishes can be obtained by changing the nip rolls from polished chrome-plated surface to Teflon coated and rubber rolls. It is also possible to replace nip rolls with dimpling rolls, so that cavities or special flow patterns can be formed on one or both faces of the co-extruded sheet. The hot forming rolls can make repeated patterns of design indentations in the electrode, if so desired.

The combination possibilities are only limited by imagination. For dimpling, the design is also repeated every revolution of the dimpling rolls. It is very much like printing repeated patterns on the fabric. These downstream modifications such as catalyst spraying, dimpling, or hot forming can be added so that all operations can be done without significant added production cost.

Figure 5:
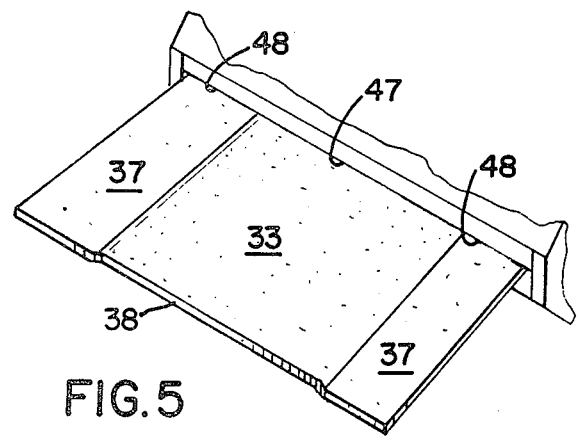
FIG. 5 is a perspective view of the electrode being extruded.

FIG. 5 is a schematic perspective view of the continuous electrode sheet emerging from the split die illustrated in FIGS. 5a, 5b and 5c.

Now referring to FIG. 2, a further safety feature for the electrochemical system is illustrated. In order to prevent or reduce the risk of spilling corrosive bromine and bromine compounds in the event of casing or compartmental rupture, the various compartments can be nested with the bromine-containing compartment 50 being the most internal compartment. The bromine compartment 50 is surrounded by the catholyte-containing compartment 51, which in turn is surrounded by the anolyte-containing compartment 52. Compartments 50, 51, and 52 are all enclosed by outer casing 53.

Shunt currents can be eliminated along formed manifolds (connectors 40) by means of applying a protective current along these electrolyte carrying conduits, in accordance with the teachings expressed in aforementioned U.S. Pat. No. 4,197,169 issued Apr. 8, 1980 to M. Zahn, P. G. Grimes and R. J. Bellows.

The two-leaved electrochemical cell construction of this invention reduces parts and is easier to fabricate and assemble than prior systems of this kind. Further modifications to the invention may occur to those skilled practitioners of this art. Such modifications have not been described for the sake of brevity.

The scope and breadth of the invention is meant to be encompassed by the following appended claims.

What is claimed is:

1. An electrochemical construction comprising a stack of cells each comprised of an integral separator and spacer disposed between adjacent electrodes each comprised of a plastic sheet having a coextruded electrically conductive mid-portion and electrically non-conductive side portions.

2. The elelctrochemical construction of claim 1, wherein the separator-spacer and said sheet electrodes are assembled by male and female connections.

3. The electrochemical construction of claim 2, wherein said connections are hollow and form fluid conduits for said cells.

4. The electrochemical construction of claim 1, wherein said separator-spacer has a microporous center portion and a non-porous border.

5. The electrochemical construction of claim 1, wherein said separator-spacer has projections disposed on each side for spacing said electrodes therefrom in order to form fluidic compartments therebetween.

6. The electrochemical construction of claim 5, wherein said projections are disposed on opposite sides of said separator-spacer.

7. The electrochemical construction of claim 1, wherein there is more than one stack of cells.

8. The electrochemical construction of claim 1, wherein said stack of cells comprises a zinc-bromine system.

9. The electrochemical construction of claim 1, further comprising means for supplying a protective current to said cell.

10. The electrochemical construction of claim 1, wherein said construction forms part of a battery.

11. The electrochemical construction of claim 1, wherein said construction forms part of a electrolyzer.

12. The electrochemical construction of claim 1, wherein said construction forms part of a fuel cell.

* * * * *